United States Patent [19]

Sokn

[11] Patent Number: 5,037,019
[45] Date of Patent: Aug. 6, 1991

[54] BICYCLE CARRIER AND ANTI-THEFT LOCKING DEVICE

[76] Inventor: Erick L. Sokn, Rte. #4, Box 154, Carbondale, Ill. 62901

[21] Appl. No.: 512,190

[22] Filed: Apr. 20, 1990

[51] Int. Cl.$^5$ .................... B60R 7/00; A47B 96/06
[52] U.S. Cl. ...................... 224/42.45 R; 248/231.6; 224/42.03 B
[58] Field of Search .............. 224/42.45 R, 42.03 B, 224/42.33, 324, 917, 322, 323; 248/314, 231.4, 231.6; 211/17, 19, 26; 269/86, 87, 87.1, 87.2, 89

[56] References Cited

U.S. PATENT DOCUMENTS

| | | | |
|---|---|---|---|
| 3,556,506 | 1/1971 | Welker | 269/72 |
| 3,556,508 | 1/1971 | Varga | 269/155 |
| 3,921,869 | 11/1975 | Rogers | 224/42.03 B |
| 3,994,425 | 11/1976 | Graber | 224/29 R |
| 4,830,531 | 5/1989 | Condit | 403/348 |
| 4,834,572 | 5/1989 | Harrington | 403/316 |
| 4,934,572 | 6/1990 | Bowman et al. | 224/42.45 R |

OTHER PUBLICATIONS

Cannondale Corp. Catalogue, 1989.

*Primary Examiner*—Henry J. Recla
*Assistant Examiner*—David J. Walczak
*Attorney, Agent, or Firm*—Don W. Weber

[57] ABSTRACT

A securing and locking device for transporting bicycles is presented which may be easily and universally attached to the front rail of a truck bed. The device has an outer inverted L-shaped bracket which is secured to the front rail of a truck bed by means of an inner L-shaped tightening mechanism. Nuts attached to the vertical and horizontal legs of the tightening mechanism tighten the entire device to the front rail of a truck by means of horizontal and vertical normal forces exerted against the truck rail and outer bracket. A quick-attach skewer device is provided on the horizontal leg of the outer L-shaped bracket so that the front fork of the bicycle may be quickly and securely attached to the bracket which is attached to the truck bed rail. A securing cable may be placed around the bicycle frame and through a slot in the outer bracket and locked. Due to the configuration of the cable slot and the location of the lock when in place, it is virtually impossible to loosen the tightening nuts. The outer bracket is constructed so that it may be universally adapted to any type of truck rail in common use in the United States.

11 Claims, 6 Drawing Sheets

BICYCLE CARRIER AND ANTI-THEFT LOCKING DEVICE

BACKGROUND OF THE INVENTION

This invention relates to transporting bicycles and more specifically to the transportation of bicycles in various sized pick-up trucks. It also relates to a device which may be installed on a pick-up truck and which effectively prevents the theft of the bicycle from the pick-up truck when the device is properly secured to the truck bed.

It is frequently the case that riders of bicycles wish to transport their bicycle from point to point in a pick-up truck before actually embarking on a bicycle journey. The transportation of bicycles in a pick-up truck is most effectively accomplished when the bicycle is securely attached to the bed of the pick-up truck. Previous bicycle carriers for pick-up trucks have consisted of a transverse member acting as a support for the bicycle itself. The support extends between the opposite side rails of a truck. The bicycle is then secured to the support by removing the front wheel of the bicycle and placing the front forks onto a circular shaft having dimensions similar to that of an axle of the front bicycle wheel. A quick-connect skewer similar to that used to hold the front wheel of a bicycle is used to clamp the front fork to the transverse support member.

The commonly used transverse support is attached to a truck by two methods. One method would be to extend the support until outward normal forces apply pressure to the opposing side rails of the truck. Another method is by attaching the transverse support member to the truck by means of screws and bolts and mounting it directly to the truck sides. This method often involves the use of opposed mounting brackets to which the transverse support member may then be attached.

Both of the methods commonly in use for securing bicycles to truck beds have a number of disadvantages. Due to the difference in the size of truck beds, at least two different sizes of transverse support member are required, one for small trucks and one for full-sized trucks. The second disadvantage involves the means for extending the support member to apply the normal outward pressure. In order to have a support which is strong enough both to hold the bicycle and to hold its position between the two truck side rails, heavy-gauged, threaded tubing or a rack and pinion extension is required. This heavy tubing or rack and pinion extension would result in much higher manufacturing costs, material costs, and shipping costs due to the added weight of the extension mechanism. The bracket method has the additional disadvantage of requiring the integrity of the side rails of the truck to be impaired due to the holes which need to be drilled into the truck rails. Both types of securing devices also require the purchase of an additional bracket which can be mounted to the main support to carry the front wheel.

It is an object of this invention to provide a means for securely attaching the front fork of a bicycle to the truck without causing damage to the vehicle. Another object of the invention is to provide a universal carrier that can be easily manufactured, assembled, shipped and installed to any type of truck. A still further object of this invention is to provide an economical and useful carrier that cannot be removed without having the proper tools and which allows the owner of the carrier and bicycle to affirmatively lock the bicycle to the truck bed thereby reducing the likelihood of theft. Other and further objects of this invention will become apparent upon reading the following description and Specification of this invention.

BRIEF DESCRIPTION OF THE INVENTION

This invention comprises an essentially L-shaped outer bracket which may be securely affixed to the front rail of a truck bed. The outer bracket has various clamping means which makes it adaptable to any type of truck bed in common use throughout the United States. The upper horizontal leg of the outer L-shaped section has a small flange at the end thereof. This flange is inserted over the front portion of the rail. An oppositely faced inner L-shaped tightening mechanism has a vertical leg which protrudes through a slot in the upper vertical section of the outer L-shaped locking mechanism. Attached to this vertical securing leg is a pressure plate which contacts the inside of the truck rail. The horizontal leg of the inner tightening mechanism protrudes through a vertical slot in the vertical leg of the outer L-shaped bracket. Near the top of the vertical leg of the outer bracket a quick-connect skewer attaching mechanism is affixed. The outer bracket is attached to the front rail of a truck by means of adjusting the inner, oppositely faced, tightening mechanism. Once the anti-theft securing device is attached to the truck rail, the front fork of the bicycle may be conveniently attached by the quick-connect skewer. Upon securing the bicycle to the anti-theft securing mechanism means of a chain and lock, the bicycle is securely attached to the truck bed and may not be removed without first removing the lock. Slight variations of the pressure pad and tightening mechanism are also present to allow the universal application of the bicycle securing device.

DETAILED DESCRIPTION OF THE PREFERRED EMBODIMENT

Figure 1:
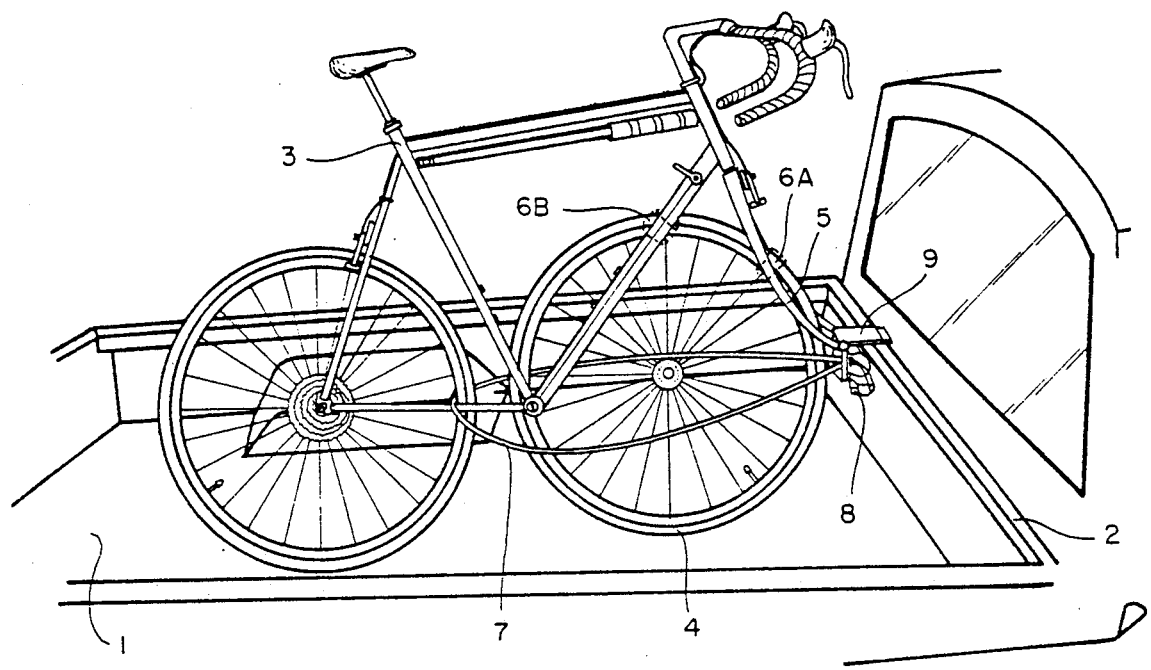
FIG. 1 is a perspective view of the securing mechanism showing a bicycle as it would be attached to the bed of a truck.

Bicycles are frequently transported in the back of a truck bed 1. The truck bed has side rails and a front rail 2 near the front end cab section of the truck. A standard bicycle 3 may be attached to the truck bed by means of this new device. In order to effect the attachment, the front wheel 4 (as best shown on FIG. 1) is first detached from the front fork 5 of the bicycle. The front wheel 4 is then secured according to the method of this invention to the frame of the bicycle by means of VELCRO strips 6A and 6B. The bicycle is then ready to be attached to the securing carrier device 9.

Figure 2:
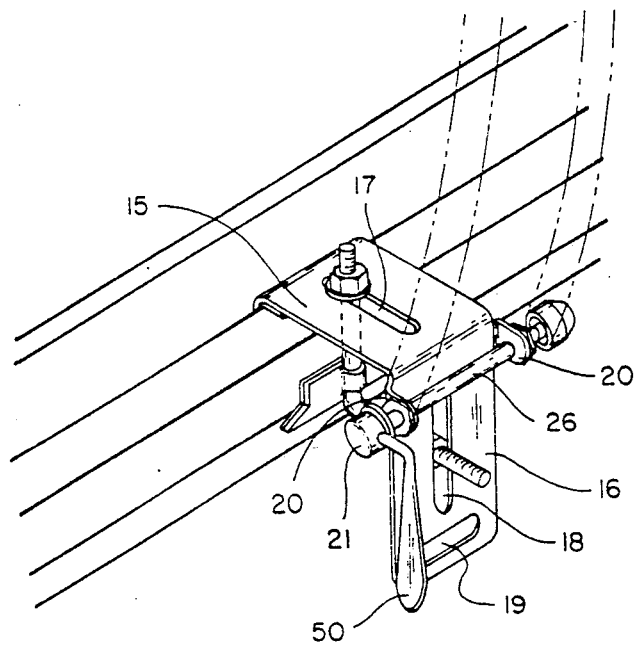
FIG. 2 is a close-up perspective view of the securing mechanism shown attached to the front rail of a truck.

A perspective view of the securing carrier is shown at FIG. 2. Various embodiments of the securing carrier which may be attached to different types of truck rails, are shown on FIGS. 4A, 4B, 4C and 4D.

The locking carrier device comprises an outer inverted L-shaped bracket 10. This outer inverted L-shaped bracket 10 has an upper horizontal leg 15 and a lower vertical leg 16. The upper horizontal leg 15 has a horizontal slot 17, as shown on FIG. 2. The lower vertical leg of the outer bracket has a vertical slot 18. The upper vertical leg of the outer bracket also has an outer bracket horizontal flange 12 at the end opposite the horizontal leg 16.

In order to attach the outer inverted L-shaped bracket 10 to the truck bed front rail 2, an inner L-shaped tightening mechanism 11 is utilized.

This inner L-shaped tightening mechanism comprises a vertical tightening leg 22 and a horizontal tightening leg 23. Slidably attached to the vertical tightening leg 22 is a pressure plate 13. This pressure plate 13 slides up or down the vertical tightening leg 22 depending on the size and type of truck rail 2 encountered.

The tightening mechanism 11 is tightened by means of a vertical tightening nut 24 and a horizontal tightening nut 25. With the outer bracket flange 12 positioned over the front rail as shown in FIGS. 2 and 4A through 4D, the tightening nuts 24 and 25 are turned so as to attach the outer bracket 10 to the truck rail 2.

A pair of axle flanges 20 are permanently affixed to the upper portion of the vertical leg of the outer bracket, as shown on FIGS. 2 and 4A through 4D. A quick-connect skewer 21 is then positioned onto the axle flanges 20 as shown on FIG. 2. The skewer has a horizontal axle 26 similar to the axle of a bicycle wheel. The front forks 5 of a bicycle may then be easily attached to the axle 26 by means of the quick-attach skewer 21.

As best shown on FIG. 2, the carrier device is attached to the front rail of the truck bed 2 by means of the tightening mechanism 11. The horizontal slot 17 allows the device to be adjusted according to the width of the rail. Various widths of truck bed front rails 27 are shown on Drawing FIGS. 4A through 4D. The vertical slot 18 on the outer bracket allows for vertical adjustment to the height of the truck bed rail. A horizontal cable slot 19, which is on the vertical leg and perpendicular to the vertical slot 18, is used for attaching the locking cable 7 and bicycle to the locking carrier device.

An alternate embodiment of this device has a V-shaped cable slot instead of the horizontal cable slot as shown. This V-shaped cable slot is formed beneath the lower terminating portion of the vertical slot 18. Use of the V-shaped slot causes a shield to be formed for the tightening nut or nuts when the bicycle is locked by the cable and lock. When using one of the pressure pads shown in Drawing FIGS. 6A through 6C, a V-slot renders it nearly impossible to remove any of the tightening nuts. This, of course, prevents the bracket from being moved out of position or being detached from the truck bed.

Figure 4A:
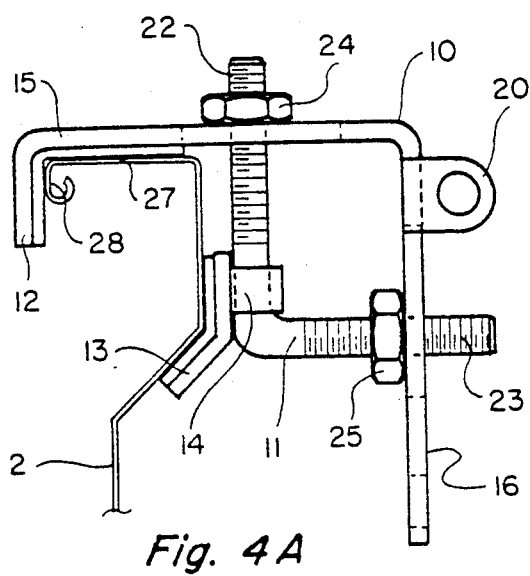
FIGS. 4A through 4D show side views of the securing mechanism as attached to various types of front rails for various types of trucks.
Figure 4B:
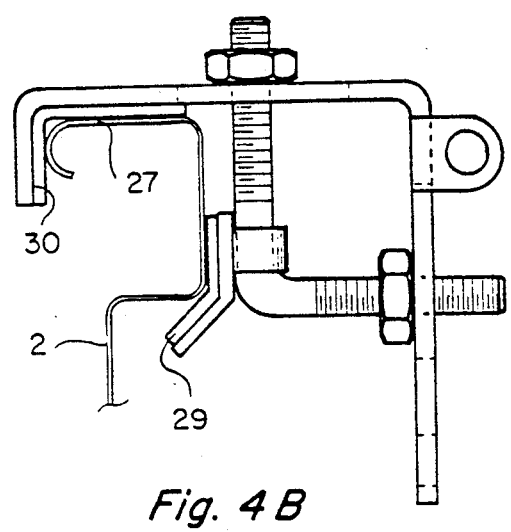
Figure 4C:
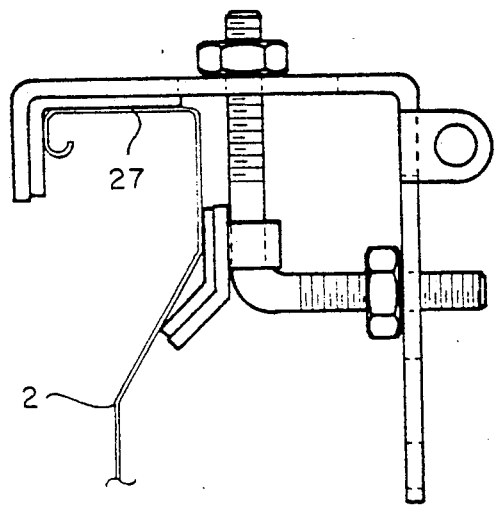
Figure 4D:
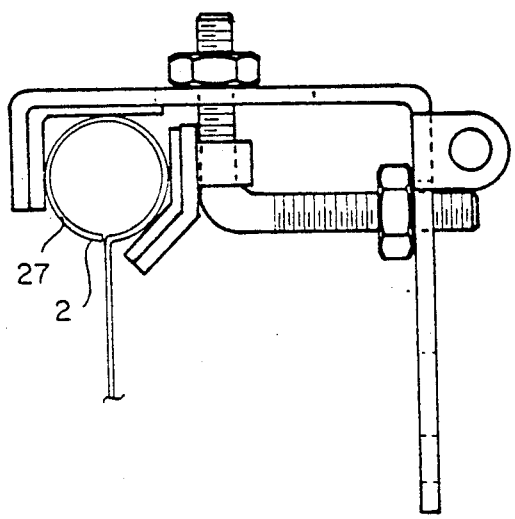
Figure 8:
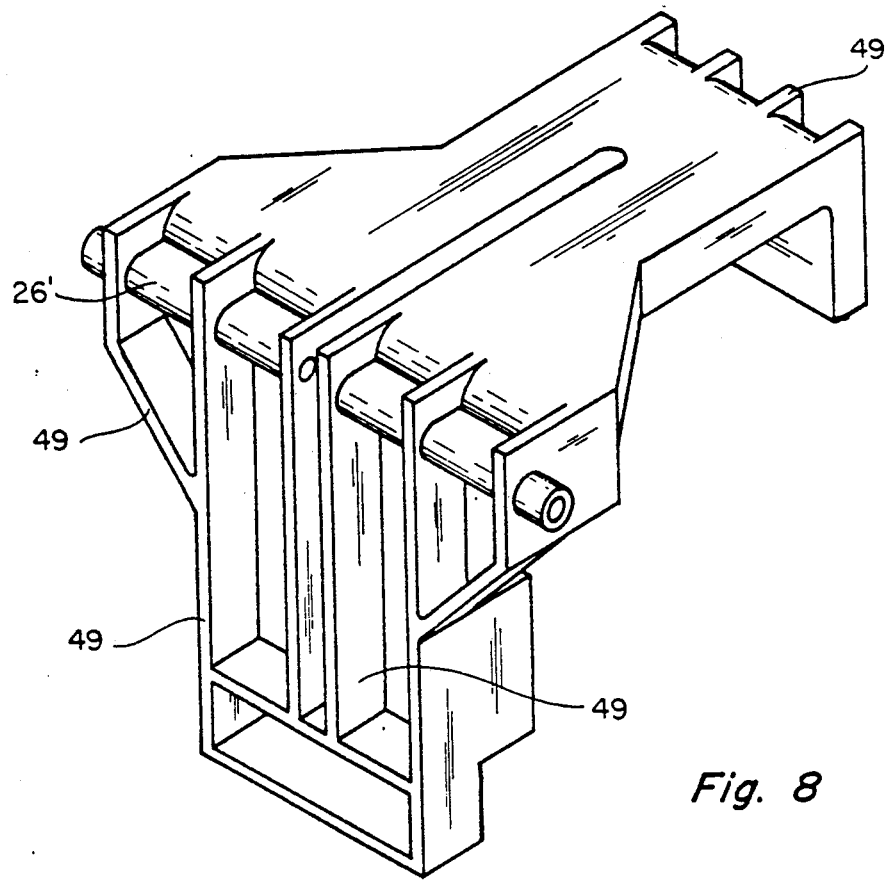
FIG. 8 shows a perspective view of a plastic embodiment of the outer L-shaped securing bracket.

In attaching the carrier device to the front rail of a truck bed, the outer bracket flange 12 is first placed over the front edge 28 of the truck rail. The vertical tightening nut 24 is then adjusted so that the pressure plate 13 is in contact with the lower angled portion of the front rail of the truck. The horizontal tightening nut is then adjusted so that the entire device is secured to the front rail of the truck as shown in FIGS. 4A through 4D. The pressure plate 13 may have a soft pad 29 so as to prevent damage to the painted surface of the truck front rail. Similarly, the outer bracket flange 12 may be padded along with the bottom surface of the upper horizontal leg of the outer bracket to prevent paint damage. Such a bracket flange pad 30 is shown in FIG. 4B. In the alternate embodiment for the outer inverted L-shaped bracket, as shown in FIG. 8, these pads 29 and 30 may be omitted. Because the alternate embodiment is made of plastic, it is unlikely that any paint damage would occur and the cushioning pads are not required.

Figure 3:
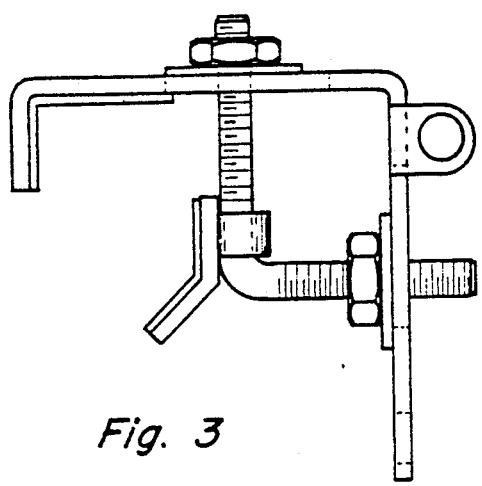
FIG. 3 is a side view of the securing mechanism shown without the quick-connect skewer.

As demonstrated on FIGS. 2 and 3, tightening the nuts 24 and 25 secures the locking carrier device to the truck bed. Tightening nut 24 applies a vertical force to the device and tightening nut 25 provides a horizontal force to the outer L-shaped bracket. These forces prevent the outer bracket from rotating about the rail.

In the preferred embodiment, the inner L-shaped tightening mechanism consists of an L-shaped screw which is threaded in both its horizontal and vertical legs. However, this L-shaped screw is not required to be a one-piece unit as long as the relation between the horizontal threaded member and the vertical threaded member is held substantially perpendicular to one another. A one-piece L-shaped threaded member will work well when used with the lanced loop 14 of the pressure plate 13, as shown in FIGS. 4A through 4D.

Figure 5A:
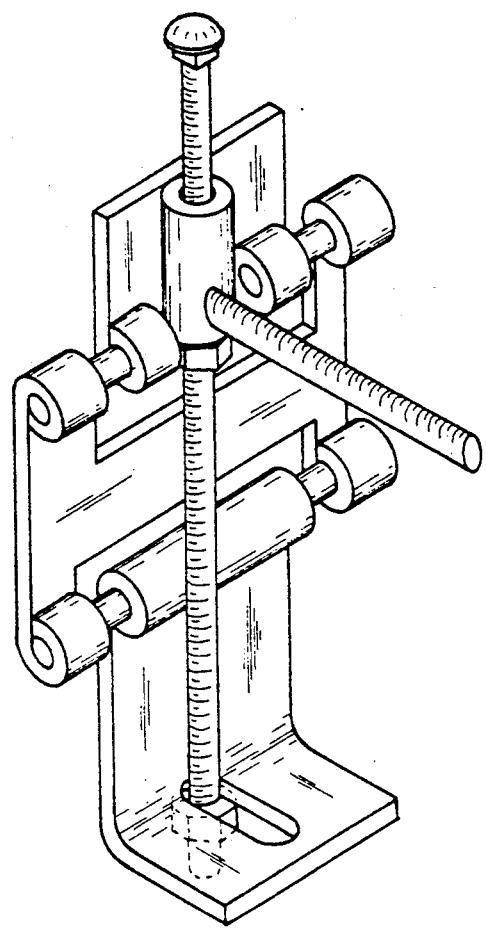
FIG. 5A shows a perspective view of an alternate construction of the tightening mechanism using a hinged pressure pad instead of the oppositely faced L-shaped tightening mechanism.
Figure 5B:
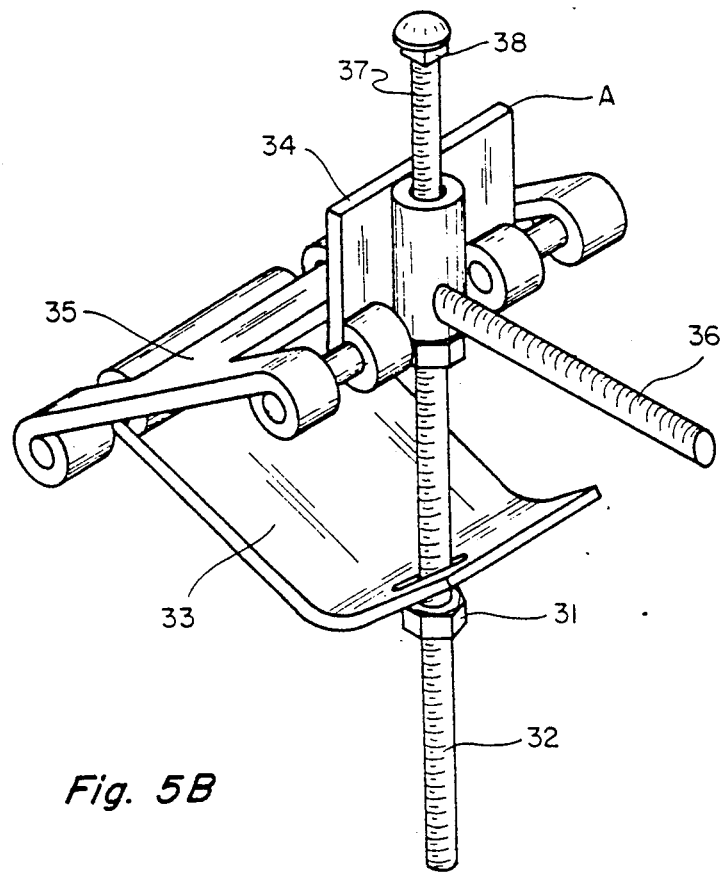
FIG. 5B shows the hinged pressure pad construction in the flexed mode.

Another method of securing the outer L-shaped bracket to the truck bed rail is shown in FIGS. 5A and 5B. FIG. 5A shows a hinged pressure pad which is capable of adjusting to any rail configuration and hence is universal in its application. The angle shown on pressure pad 13 is not fixed in this embodiment but may vary according to the configuration of the truck bed rail encountered. (FIGS. 5A and 5B form an alternate embodiment to the inner L-shaped tightening mechanism 11 shown on FIGS. 4A through 4D.) The variable angle of the alternate tightening mechanism, best shown on FIG. 5, is accomplished by simply tightening the angle bolt 31. Tightening the angle bolt 31 on the vertical threaded member 32 of the variable pressure plate 33 varies the angle between the horizontal leg 34 of the variable pressure plate and the oblique leg 35. FIG. 5A shows the variable pressure plate 33 fully open with both the horizontal and oblique legs parallel to the vertical threaded member 32. FIG. 5B shows the variable pressure plate in a partially closed position creating an oblique angle between legs 34 and 35.

Both FIGS. 5A and 5B are shown without the outer inverted L-shaped bracket attached. This alternate embodiment for the inner tightening mechanism is attached to the outer inverted L-shaped bracket by placing the horizontal attaching leg 36 through the vertical slot 18 on the outer L-shaped bracket and by placing the top of the vertical threaded member 37 through the horizontal slot on the horizontal leg of the outer inverted L-shaped bracket. A variable pressure plate attaching nut 38 is used in place of the vertical tightening nut 24 of FIG. 4A in practicing this embodiment.

Figure 6A:
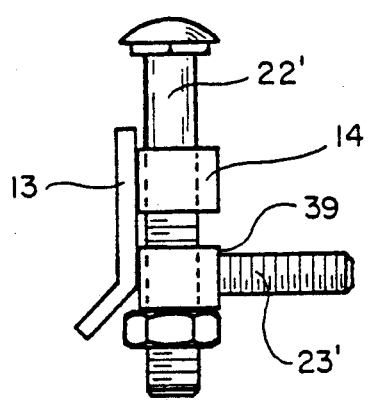
FIGS. 6A and 6B are side views of different types of pressure pads which may be used for attaching the device to the front rail.
Figure 6B:
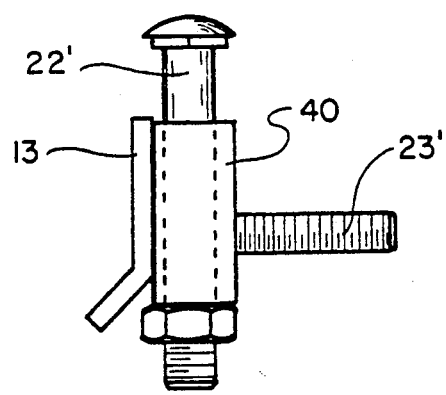
Figure 6C:
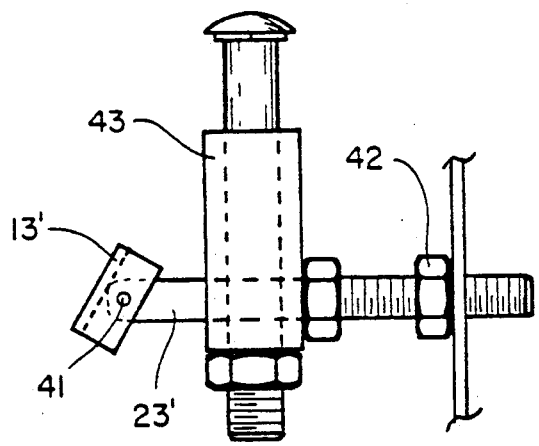
FIG. 6C is a side view of a pressure pad which may be used to apply a variable angle force to the front rail of the truck.

FIGS. 6A through 6C show alternate constructions for the pressure pad and inner L-shaped tightening mechanism. FIG. 6A shows the vertical leg 22' connected to the horizontal leg 23' by means of a lanced loop 39. The lanced loop forms a slidable collar about the vertical leg of the tightening mechanism. The horizontal leg 23' of the tightening mechanism is then welded to the collar to form the perpendicular L-shaped tightening mechanism. As before, the pressure plate 13 is slidably attached about the vertical leg 22' by means of a lanced loop 14.

Another embodiment for the inner L-shaped tightening mechanism is shown at FIG. 6B. In this embodiment, the lanced loops 39 and 14 shown on FIG. 6A are combined. A cylindrical hollow collar 40 has attached to it a pressure pad 13 and a horizontal tightening leg 23'. In this embodiment, the horizontal tightening leg and the pressure pad slide vertically about the vertical leg 22' of the tightening mechanism as shown. The alternate embodiments shown in FIGS. 6A and 6B allow the slotted holes 17 and 18 to remain centered.

Yet another variation for the inner L-shaped tightening mechanism is shown on FIG. 6C. In this embodiment, the pressure pad may be adjusted to any angle. According to the embodiment taught by the variation as shown in FIG. 6C, the pressure pad 13' is rotatably attached to a separate horizontal tightening leg 23' by means of a pin 41. In this embodiment, an additional nut 42 is added to the separate horizontal leg of the inner tightening mechanism to hold the block against the rails. The holes in the block 43 are substantially at ninety degrees to each other, and are offset as shown in FIG. 6D.

Figure 6D:
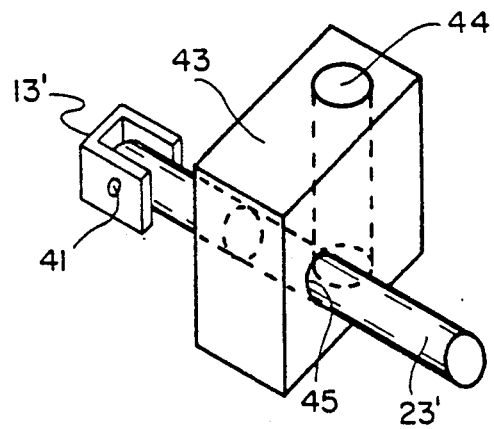
FIG. 6D is a perspective view showing the block of FIG. 6C and the offset holes therein.

As shown in FIG. 6D, one way to adjust the angle of the plate involves offset holes 44 and 45. In this embodiment, the vertical hole 44 for the vertical leg of the tightening mechanism is offset from the horizontal hole 45. The separate horizontal leg 23' of the tightening mechanism extends through the block 43. The outer end of the separate horizontal leg has the rotatably attached pressure plate 13' attached about pin 41.

Figure 6E:
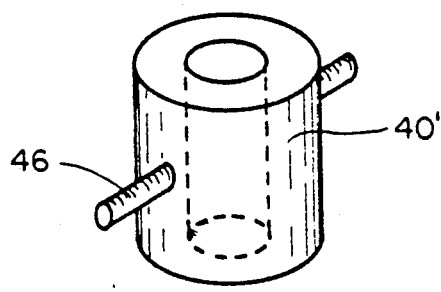
FIG. 6E is an exploded perspective view of two mechanisms used to attach a variable pressure plate to the tightening mechanism.
Figure 6F:
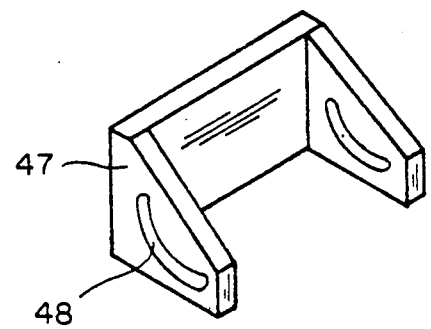

Yet another method of attaching a variable pressure plate to the vertical leg of the tightening mechanism is shown in FIGS. 6E and 6F. In place of the two adjusting plates 33 and 35 shown on FIG. 5B, there is used the hollow cylindrical collar 40' having threaded arms 46. The hinged plate 47 shown in FIG. 6F is then attached about the threaded arm 46 by means of the radiused slotted holes 48. The top of the hinged plate 47 is pivotably attached to the bottom of the horizontal leg of the variable pressure plate 34. In this embodiment, the cylindrical collar 40' would slide up the vertical threaded member 32 to adjust to the height of the truck rail. Hinged plate 47 would rotate according to the angle of the rail encountered and the tightening nut 31 would be adjusted to hold the height of the collar 40' at the proper position to secure the outer inverted L-shaped bracket in place.

Figure 7:
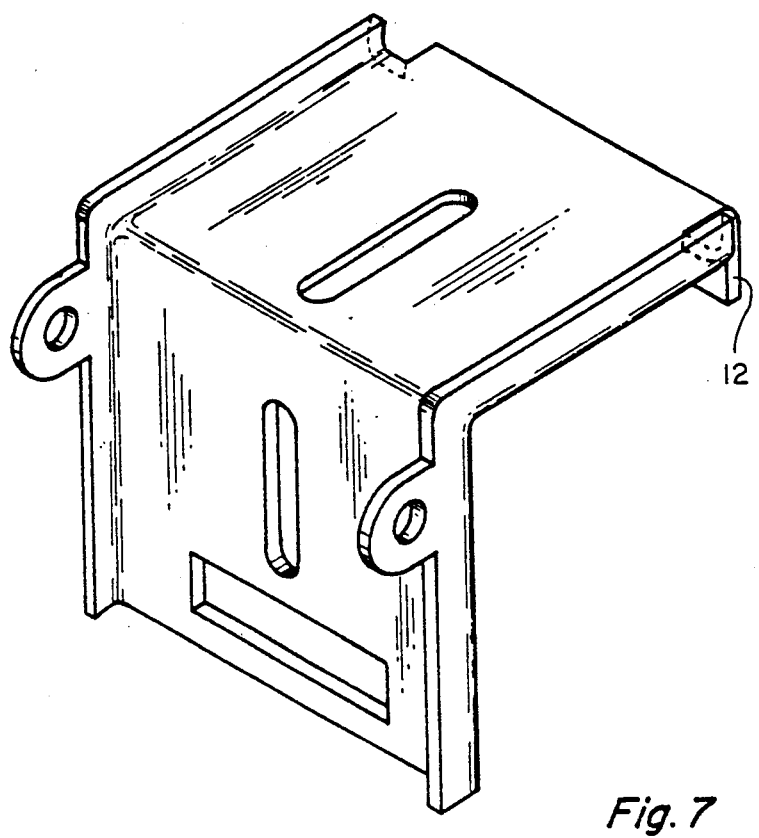
FIG. 7 shows a perspective view of one embodiment of the outer L-shaped securing bracket.

FIG. 7 shows one embodiment of the outer inverted L-shaped bracket which is of unitary construction and made of metal. The outer flanged bracket 12 may alternatively be secured to the outer L-shaped bracket by means of welding and reinforcements as shown on FIG. 7. The slots, flanges and other aspects of the outer inverted L-shaped bracket remain essentially the same.

FIG. 8 shows a plastic embodiment of the outer inverted L-shaped bracket showing the various points of reinforcement. Reinforcing ridges 49 help to strengthen this particular embodiment. In place of the axle 26, there is a plastic axle 26' as best shown on FIG. 8.

Figure 9:
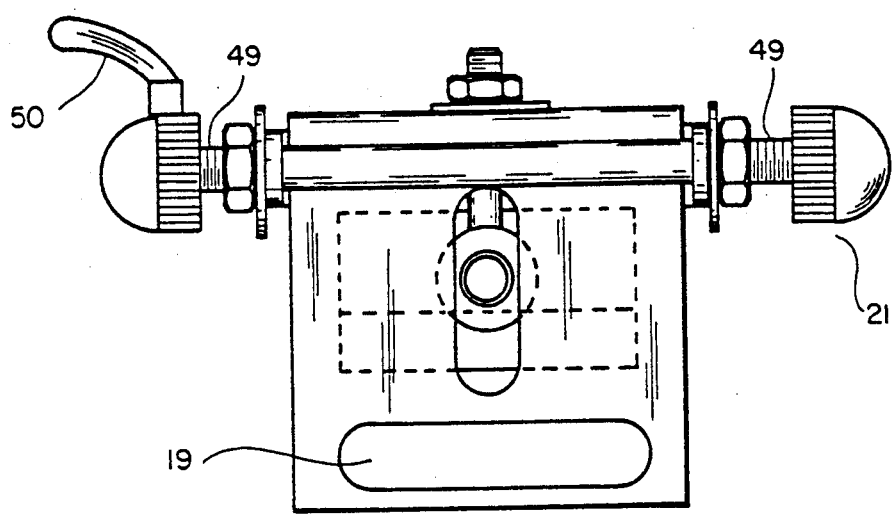
FIG. 9 shows a front view of the locking mechanism with the quick-attach skewer in place.

FIG. 9 shows a front view of the device. In FIG. 9, the horizontal cable slot 19 is present for securing the bicycle to the carrier device and thence to the truck bed. The quick-attached skewer 21 is shown. Once the carrier device has been attached to the truck rail, the front forks 5 of the bicycle frame 3 are inserted into fork slots 49. The quick-attach skewer handle 50 is then tightened so that the front forks 5 are firmly attached in the fork slots 49. To complete the attachment of the bicycle frame to the truck, a securing cable 7 is attached about the bicycle frame. The ends of the securing cable 7 are both looped and are placed through the cable slot 19. The loops are then securely fastened by means of a padlock 8, as best shown on FIG. 1. If the cable slot 19 is arranged so that it is in a V-shape with the bottom of the "v" near the bottom of the horizontal slot 17, the two loops, when attached by the padlock 8, make it nearly impossible for a person to loosen the carrier device 9 without first unlocking the padlock 8 and removing the cable and cable ends.

Figure 10A:
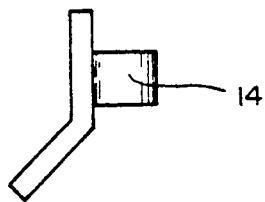
FIGS. 10A through 10C show the manufacturing method used to produce the angled ridge.
Figure 10B:
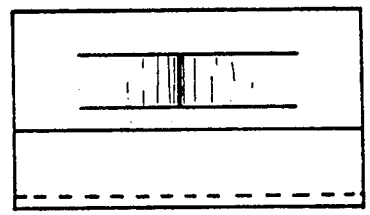
Figure 10C:

The pressure plate lanced loops may be constructed as shown in FIGS. 10A through 10C. As shown in FIG. 10B, a rectangular shaped piece of metal is cut so that loop 51 may be raised from the metal. When loop 51 is raised from the metal it forms the collar 14 as shown at FIG. 10A.

Figure 11:
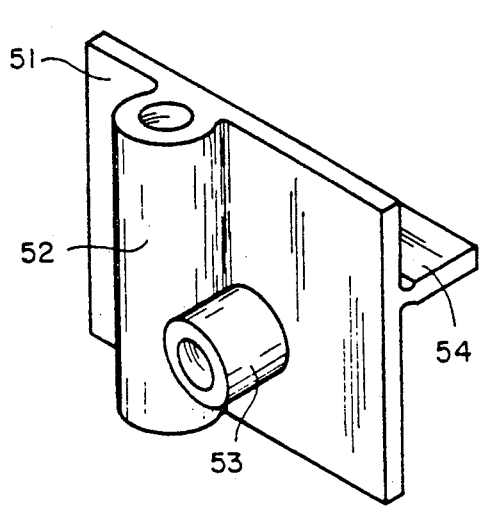
FIG. 11 is a front perspective view of one embodiment of the inner L-shaped tightening mechanism.
Figure 12:
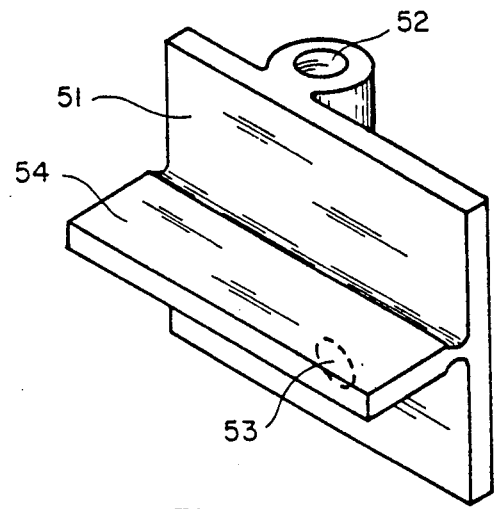
FIG. 12 is a rear perspective view of the inner L-shaped mechanism shown in FIG. 11.

Another variation for the inner L-shaped mechanism is shown on FIGS. 11 and 12 on the preferred embodiment. A vertical plate 51 is formed having a vertical cylinder 52 and a horizontal cylinder 53. These cylinders receive the vertical threaded member 32 and the horizontal attaching leg 36, shown in FIG. 5B. The vertical plate 51 has a horizontal hinged flange 54 which adjusts to the proper angle when the entire device is secured in place on the truck. The mechanism shown in FIGS. 11 and 12 replaces pieces 33, 34 and 35 shown in FIG. 5B. This part could be made of plastic, in which case the hinged flange comprises a living hinge or the part could be of metal. In constructing this part from metal the hinged flange and vertical plate would be two pieces, pivotably attached by a hinge.

The device as shown and described is capable of being attached to any type of truck rail as shown in FIGS. 4A through 4D. The different types of pressure plates and methods of attachment to the inner L-shaped tightening mechanism may be used interchangeably.

Having fully described my invention, I claim:

1. A securing and locking device for transporting a bicycle and adapted to be secured to a horizontally extending member having top, bottom, inner and outer surfaces, comprising:

(a) an outer inverted L-shaped bracket having an outer vertical leg and an outer horizontal leg adapted to extend over the top surface of the horizontally extending member wherein said horizontal leg has a horizontal slot therein and an outer bracket flange attached thereto such that it extends along the outer surface of the horizontally extending member, and said vertical leg has a vertical slot and a cable slot therein;

(b) an inner L-shaped tightening mechanism having a threaded vertical leg and a threaded horizontal leg said vertical tightening leg being adjustably secured through the horizontal slot of the outer bracket and said horizontal tightening leg being adjustably secured through the vertical slot of the outer bracket;

(c) a pressure plate slidably secured to the vertical tightening leg of the inner tightening mechanism and adapted to receive the inner surface of the horizontally extending member whereby the horizontally extending member is secured between the outer L-shaped bracket and said pressure plate;

(d) means for attaching the front fork of a bicycle directly to the securing and locking device.

2. A securing and locking device for transporting a bicycle as in claim 1, further comprising a pair of opposing axle flanges secured to the upper portion of said outer vertical leg and a quick-attach skewer whereby the front fork of a bicycle may be quickly and securedly attached to said device.

3. A securing and locking device for transporting a bicycle as in claim 2, further comprising a cable and lock secured about the frame of the bicycle and through said cable slot.

4. A securing and locking device for transporting a bicycle as in claim 3, further comprising VELCRO straps for securing the front wheel of said bicycle to the frame of said bicycle.

5. A securing and locking device for transporting a bicycle as in claim 1, wherein said pressure plate comprises a fixed plate having fixed horizontal and oblique surfaces slidably attached to the vertical tightening leg by means of a lanced loop.

6. A securing and locking device for transporting a bicycle as in claim 1, wherein the inner L-shaped tightening mechanism is adjustably secured to the outer inverted L-shaped bracket by means of tightening nuts.

7. A securing and locking device for transporting a bicycle as in claim 1, wherein the inner L-shaped tightening mechanism comprises a variable pressure plate having the angle between the horizontal leg and the oblique leg of said plate adjustable by means of a variable plate tightening nut.

8. A securing and locking device for transporting a bicycle as in claim 1, wherein the pressure plate is slidably attached to the vertical tightening leg by means of a lanced loops and wherein said horizontal tightening leg is secured to said vertical tightening leg by means of a lanced loop collar.

9. A securing and locking device for transporting a bicycle as in claim 1, wherein the pressure plate and horizontal tightening leg are attached to a sliding collar which slidably connects the pressure plate and horizontal tightening leg to the vertical tightening leg.

10. A securing and locking device for transporting a bicycle as in claim 9, wherein said sliding collar has threaded arms attached thereto, further comprising a slotted plate slidably attached to said collar.

11. A securing and locking device for transporting a bicycle as in claim 1, wherein the pressure plate secured to the vertical leg of the inner tightening mechanism comprises a vertical plate having vertical and horizontal cylinders integrally formed therewith and a horizontal hinged flange attached to said vertical plate.

* * * * *